(12) United States Patent
Nekozuka

(10) Patent No.: US 10,120,444 B2
(45) Date of Patent: Nov. 6, 2018

(54) WEARABLE DEVICE

(71) Applicant: KYOCERA Corporation, Kyoto-shi, Kyoto (JP)

(72) Inventor: Hikaru Nekozuka, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 107 days.

(21) Appl. No.: 15/280,776

(22) Filed: Sep. 29, 2016

(65) Prior Publication Data

US 2017/0090555 A1  Mar. 30, 2017

(30) Foreign Application Priority Data

Sep. 30, 2015 (JP) ................. 2015-193140

(51) Int. Cl.
*G06F 3/01* (2006.01)
*G06F 3/033* (2013.01)
(Continued)

(52) U.S. Cl.
CPC ............. *G06F 3/014* (2013.01); *G06F 3/017* (2013.01); *G06F 3/04817* (2013.01); *G06F 3/04842* (2013.01); *G06F 3/005* (2013.01); *G06F 3/015* (2013.01); *G06F 2203/011* (2013.01); *G06F 2203/0331* (2013.01)

(58) Field of Classification Search
CPC ........ G06F 3/011; G06F 3/017; G06F 3/0482; G06F 3/04845; G06F 2203/011; G06F 3/014; G06F 3/015; G06F 3/01; G06F 3/00; G06F 3/005; G06F 3/04842;
(Continued)

(56) References Cited

U.S. PATENT DOCUMENTS 5,381,158 A * 1/1995 Takahara ................ G06F 3/011
345/156
6,544,123 B1 * 4/2003 Tanaka .................... A63F 13/10
463/1
(Continued)

FOREIGN PATENT DOCUMENTS

EP   1394665 A1 * 3/2004
JP   2015-2939 A   1/2015

OTHER PUBLICATIONS

ModernBob, Technet (https://social.technet.microsoft.com/Forums/windowsserver/en-US/4ad06e11-2ac1-4480-ace8-833a0b1cbe98/windows-7-sleep-timeout-not-working-as-expected?forum=w7itprogeneral), Apr. 2010.*

(Continued)

*Primary Examiner* — Julie Anne Watko
(74) *Attorney, Agent, or Firm* — Hauptman Ham, LLP

(57) ABSTRACT

A wearable device includes a detection module configured to be worn by an upper limb of a user and detect a body motion in the upper limb, and a controller configured to detect the body motion in the upper limb on a basis of a detection result from the detection module and generate a control signal in accordance with the body motion. If the controller detects, as the body motion, at least two of a finger motion, a hand motion, and an arm motion in the upper limb within a first predetermined period of time, the controller recognizes the two body motions as a series of body motions and generates, as the control signal, a first control signal in accordance with the series of body motions.

13 Claims, 5 Drawing Sheets

(51) Int. Cl.
*G06F 3/0484* (2013.01)
*G06F 3/0481* (2013.01)
*G06F 3/00* (2006.01)

(58) Field of Classification Search
CPC .. G06F 3/0484; G06F 3/04817; G06F 3/0481; G06F 3/04812; G06F 3/048; G06F 2203/0331
See application file for complete search history.

(56) References Cited

U.S. PATENT DOCUMENTS

| | | | | |
|---|---|---|---|---|
| 2014/0055352 | A1* | 2/2014 | Davis | G06F 3/017 345/156 |
| 2015/0143283 | A1* | 5/2015 | Noda | G06F 3/017 715/784 |
| 2015/0248159 | A1* | 9/2015 | Luo | G06F 3/014 345/156 |
| 2015/0261307 | A1* | 9/2015 | Morikawa | A61B 5/0488 345/156 |
| 2016/0007876 | A1* | 1/2016 | Yoshioka | A61B 5/0492 600/384 |

OTHER PUBLICATIONS

JPO office action, Kyocera, Patent Application No. 2015-193140 dated Dec. 14, 2016, English translation.*
Argelaguet et al, "A survey of 3D object selection techniques for virtual environments", Computers & Graphics 37 (2013) 121-136. (Year: 2013).*

* cited by examiner

FIG.3

| PATTERN | BODY SITE | TYPES OF BODY MOTIONS | DETECTION MODULE |
|---|---|---|---|
| 1 | FINGER | FINGER FLEXION | BIOPOTENTIAL DETECTOR |
| 2 | | FINGER EXTENSION | BIOPOTENTIAL DETECTOR |
| 3 | | MOTION OF BRINGING TWO FINGERS CLOSER TO (OR INTO CONTACT WITH) EACH OTHER | BIOPOTENTIAL DETECTOR |
| 4 | | MOTION OF SEPARATING TWO FINGERS FROM EACH OTHER | BIOPOTENTIAL DETECTOR |
| 5 | HAND | PALMAR FLEXION | BIOPOTENTIAL DETECTOR |
| 6 | | DORSAL FLEXION | BIOPOTENTIAL DETECTOR |
| 7 | | RADIAL FLEXION | BIOPOTENTIAL DETECTOR |
| 8 | | ULNAR FLEXION | BIOPOTENTIAL DETECTOR |
| 9 | ARM | PRONATION OF FOREARM | BIOPOTENTIAL DETECTOR, ACCELERATION SENSOR, ORIENTATION SENSOR |
| 10 | | SUPINATION OF FOREARM | BIOPOTENTIAL DETECTOR, ACCELERATION SENSOR, ORIENTATION SENSOR |
| 11 | | MOTION OF BRINGING FOREARM CLOSER TO TRUNK | ACCELERATION SENSOR, ORIENTATION SENSOR |
| 12 | | MOTION OF DISTANCING FOREARM FROM TRUNK | ACCELERATION SENSOR, ORIENTATION SENSOR |
| 13 | | MOTION OF MOVING ARM ABOUT SHOULDER (WITHOUT ARM FLEXION) | ACCELERATION SENSOR |

FIG.4A

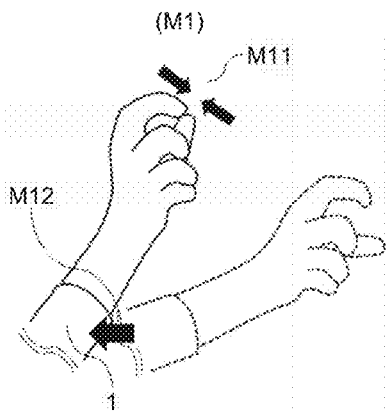

FIG.4B

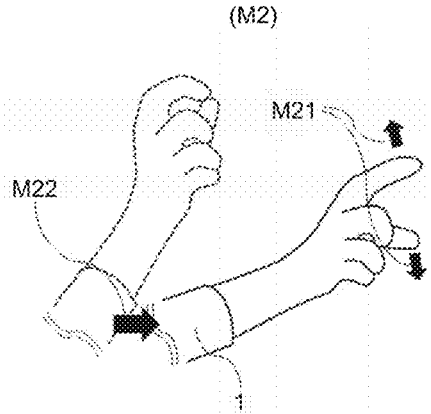

WEARABLE DEVICE

CROSS-REFERENCE TO RELATED APPLICATION(S)

The present application claims priority to and incorporates by reference the entire contents of Japanese Patent Application No. 2015-193140 filed in Japan on Sep. 30, 2015.

BACKGROUND OF THE INVENTION

1. Field of the Invention

The present invention relates to a wearable device capable of being worn by a user's body and capable of operations in accordance with a motion of the body.

2. Description of the Related Art

There has been recently disclosed a biopotential input sensor device including: a biopotential measurement module configured to measure a biopotential of a user with a plurality of measuring electrodes; a motion detection module configured to detect a motion corresponding to a first motion of the user from the biopotential of the user; a motion determination module configured to determine the motion of the user corresponding to the measured biopotential of the user when the motion detection module detects the motion corresponding to the first motion; and a device controller configured to determine an operation corresponding to the determined motion of the user and transmit the determined operation to a main unit of a device to be controlled (Japanese Patent Application Laid-Open No. 2015-2939).

In a wearable device capable of operations in accordance with body motions, it is preferable that no operation be mistakenly caused by a motion unintended by a user.

SUMMARY OF THE INVENTION

It is an object of the present invention to at least partially solve the problems in the conventional technology.

A wearable device according to one aspect includes:

a detection module configured to be worn by an upper limb of a user and detect a body motion in the upper limb; and a controller configured to detect the body motion in the upper limb on a basis of a detection result from the detection module and generate a control signal in accordance with the body motion, wherein if the controller detects, as the body motion, at least two of a finger motion, a hand motion, and an arm motion in the upper limb within a first predetermined period of time, the controller recognizes the two body motions as a series of body motions and generates, as the control signal, a first control signal in accordance with the series of body motions.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 lists, by way of example, the types of body motions that can be detected by a controller 16;

FIGS. 4A and 4B are diagrams each for explaining one example of body motions that can be detected by the controller 16;

DETAILED DESCRIPTION OF THE PREFERRED EMBODIMENTS

Figure 1:
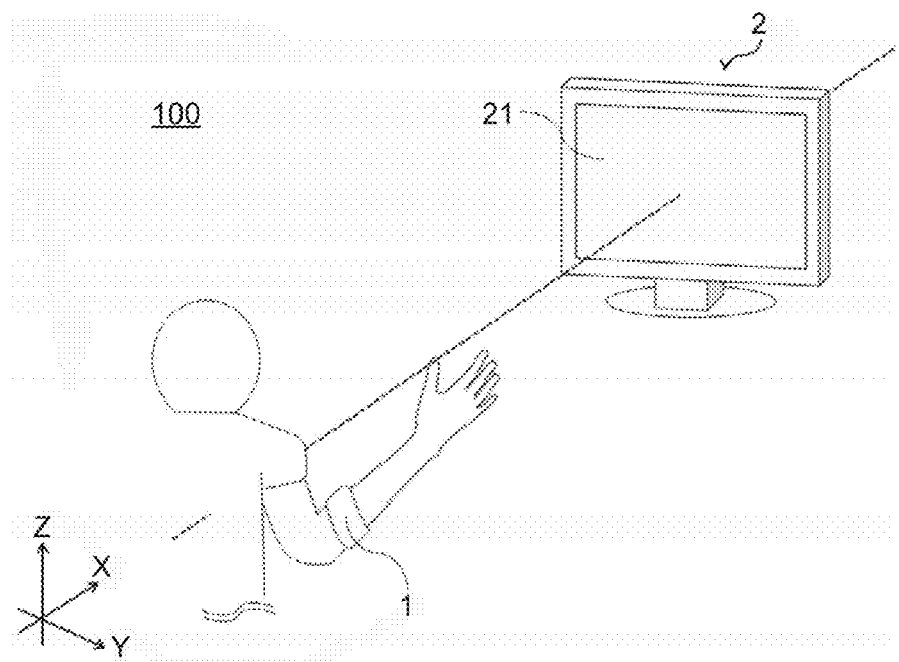
FIG. 1 is a diagram illustrating an input system 100 formed from a wearable device 1 according to the present invention and an external display device 2.

Embodiments for embodying a wearable device according to the present invention will now be described in detail with reference to the drawings. In the following description, like components may be denoted by the same reference numerals. Also, repeated description may be omitted. It should be noted that the present invention is not limited by the following description. Components in the following description encompass those that can be readily envisaged by those skilled in the art, substantially the same components, and what is called equivalents.

FIG. 1 is a diagram illustrating an input system 100 including a wearable device 1 according to the present invention and an external display device 2. As illustrated in FIG. 1, the wearable device 1 can communicate with the display device 2 via wired or wireless connection therewith. The display device 2 receives a control signal from the wearable device 1 via communication with the wearable device 1, and changes, for example, display contents on the basis of the control signal. Examples of the display device 2 include, but are not limited to, a television set, a smartphone, a notebook computer, etc.

As illustrated in FIG. 1, the wearable device 1 is worn by the forearm in an upper limb of a user. The upper limb as used herein refers to the human arm and hand, and may include the upper arm, the forearm, and the hand (or fingers). As illustrated in FIG. 1, a three-dimensional orthogonal coordinate system is defined in a space including the user, the wearable device 1, and the display device 2. The user faces the front side of the display device 2 and is oriented to the X-axis direction perpendicular to a display surface (display area 21) of the display device 2.

The wearable device 1 is detachably worn by the upper limb of the user. The wearable device 1 may be a wristband type or wristwatch type device, for example. The most part of the wearable device 1 is made of, for example, a material having flexibility and stretch properties so as to achieve intimate contact with the upper limb of the user.

Figure 2:
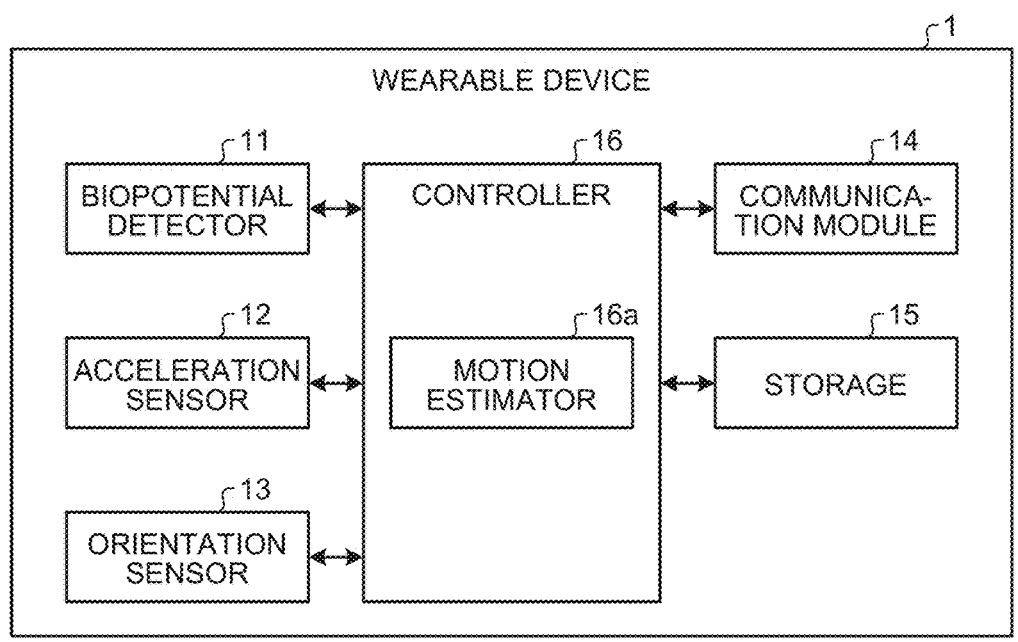
FIG. 2 is a diagram for explaining functions of the wearable device 1 according to the present invention.

Referring to FIG. 2, functions of the wearable device 1 according to the present invention will next be described. FIG. 2 is a functional block diagram of the wearable device 1 according to the present invention. As illustrated in FIG. 2, the wearable device 1 includes a biopotential detector 11, an acceleration sensor 12, an orientation sensor 13, a communication module 14, a storage 15, and a controller 16.

The biopotential detector 11 employs a plurality of electrically-connected vital electrodes to detect biopotential generated in the body of the user. The biopotential is, for example, myopotential generated due to a body motion of a user. Various known methods can be applied to a method of detecting myopotential by the biopotential detector 11. The biopotential detector 11 outputs information based on the detected myopotential, e.g., the magnitude of the detected potential or an amount of potential change, to the controller 16. When the wearable device 1 is a wristband type or wristwatch type device as illustrated in FIG. 1, the vital electrodes are arranged on the inner surface (surface to be in contact with the skin of the user) of the wearable device 1.

The acceleration sensor 12 detects the direction and magnitude of acceleration acting on the wearable device 1. The acceleration sensor 12 outputs information based on the detected direction and magnitude of acceleration to the controller 16.

The orientation sensor 13 detects, for example, the geomagnetic direction, and detects the direction (orientation) of the wearable device 1 on the basis of such a geomagnetic direction. The orientation sensor 13 outputs information based on the detected orientation of the wearable device 1 to the controller 16.

The communication module 14 is capable of wireless communication. The communication module 14 can support a Near Field Communication system. The Near Field Communication system includes Bluetooth (registered trademark), wireless LAN (IEEE802.11), ZigBee (registered trademark), infrared communication, visible light communication, Near Field Communication (NFC), etc. The communication module 14 may support a plurality of communication systems. The communication module 14 may support a cellular phone communication standard such as 2G, 3G, or 4G, for example. Via wireless communication connection with the display device 2 having a wireless communication function, the wearable device 1 can transmit and receive various signals to and from the display device 2.

The communication module 14 may communicate with the display device 2 via the wired connection therewith. In this case, the wearable device 1 includes a connector to which the display device 2 is connected. Examples of the connector include, but are not limited to, a Universal Serial Bus (USB), a High-Definition Multimedia Interface (HDMI) (registered trademark), Light Peak (Thunderbolt (registered trademark)), a general-purpose terminal such as an earphone microphone connector, etc. The connector may be a dedicated terminal such as a Dock connector.

The storage 15 includes a non-volatile memory device such as a flash memory, and stores various programs and data. Programs stored in the storage 15 include a control program. The storage 15 may be composed of a combination of a portable storage medium such as a memory card and a reading and writing device for performing reading from and writing to the storage medium. In this case, the control program may be stored in the storage medium. Alternatively, the control program may be obtained from a server device or the display device 2 via wireless communication or wired communication.

The controller 16 includes an arithmetic processing unit. Examples of the arithmetic processing unit include, but are not limited to, a central processing unit (CPU), a system-on-a-chip (SoC), a micro control unit (MCU), a field-programmable gate array (FPGA), a coprocessor, etc. The controller 16 can integrally control the operations of the wearable device 1. Various functions of the wearable device 1 can be implemented in accordance with control made by the controller 16.

Specifically, the controller 16 can execute instructions contained in the programs stored in the storage 15. The controller 16 can refer to data stored in the storage 15 as needed. The controller 16 controls function modules in accordance with data and instructions. The controller 16 implements various functions by controlling the function modules. Although the function modules include the communication module 14, for example, the function modules are not limited thereto. The controller 16 includes a motion estimator 16a. The controller 16 implements the motion estimator 16a by executing a control program. The motion estimator 16a detects a user's body motion on the basis of the information output from the biopotential detector 11, the acceleration sensor 12, or the orientation sensor 13.

The types of body motions that can be detected by the controller 16 when the wearable device 1 is worn by the forearm of the user will next be described. FIG. 3 lists, by way of example, the types of body motions that can be detected by the controller 16. The actors of upper limb body motions that can be detected by the wearable device 1 are classified into fingers, a hand, and an arm. FIG. 3 also lists the types of detection modules capable of estimating such body motions.

Finger motions include: a motion (Pattern 1) of flexing at least one of the first to fifth fingers (the thumb, the forefinger, the middle finger, the ring finger, and the little finger); a motion (Pattern 2) of extending at least one of the first to fifth fingers; a motion (Pattern 3) of bringing at least two of the first to fifth fingers closer to, or into contact with, each other; and a motion (Pattern 4) of separating at least two of the first to fifth fingers from each other. In the motion of Pattern 1, a motion of flexing all of the first to fifth fingers or a motion of flexing the second to fifth fingers can be restated as a motion of clasping the hand. In the motion of Pattern 2, a motion of extending all of the first to fifth fingers can be restated as a motion of unclasping the hand. In the motion of Pattern 3, a motion of bringing the first finger (thumb) and any one of the second to fifth fingers into contact with each other can be restated as a pinching motion. The motions of Patterns 1 to 4 can be detected by the controller 16 on the basis of detection results from the biopotential detector 11. In this case, vital electrodes can be arranged in the wearable device 1 in such a manner that the vital electrodes are attached to body sites in charge of the motions of Patterns 1 to 4. The motions of Patterns 1 to 4 may be, or may not be, accompanied by the flexion and extension of one or more joints in a finger.

Hand motions include: palmar flexion (Pattern 5); dorsal flexion (Pattern 6); radial flexion (Pattern 7); and ulnar flexion (Pattern 8). The palmar flexion is a body motion in which the wrist is flexed toward the palm side. The dorsal flexion is a body motion in which the wrist is flexed toward the back of the hand. The radial flexion is a body motion in which the wrist joint is flexed toward the radius constituting the forearm (toward the thumb side). For example, the radial flexion in the right upper limb is the same as flexing the wrist toward the left with the back of the hand in the right forearm facing upward and the palm of the hand facing downward. The ulnar flexion is a body motion in which the wrist joint is flexed toward the ulna constituting the forearm (toward the little finger side). For example, the ulnar flexion in the right upper limb is the same as flexing the wrist toward the right with the back of the hand in the right forearm facing upward and the palm of the hand facing downward. The respective motions of Patterns 5 to 8 can be detected by the controller 16 on the basis of detection results from the biopotential detector 11. In this case, vital electrodes can be arranged in the wearable device 1 in such a manner that the vital electrodes are attached to body sites in charge of the motions of Patterns 5 to 8. A motion of rotating the wrist about the longitudinal direction of the forearm, which is performed by a combination of the motions of Patterns 5 to 8, can also be detected by the controller 16 on the basis of detection results from the biopotential detector 11.

Arm motions include: pronation of the forearm (Pattern 9); supination of the forearm (Pattern 10); a motion of bringing the forearm closer to the trunk (Pattern 11); a motion of distancing the forearm from the trunk (Pattern 12); and a motion of moving the arm about the shoulder (Pattern 13). The pronation of the forearm is a body motion in which the forearm is rotated in such a manner that the back of the hand faces the face of the user. In the right upper limb, for example, the pronation of the forearm is a motion rotating the right forearm in a counterclockwise direction about such a right forearm. The supination of the forearm is a body motion in which the forearm is rotated in such a manner that the palm of the hand faces the face of the user. In the right upper limb, for example, the supination of the forearm is a motion rotating the right forearm in a clockwise direction about such a right forearm. The motion of bringing the forearm closer to the trunk is, for example, a motion of bringing the forearm and the upper arm closer to each other with the elbow functioning as a pivot (a motion of flexing the arm). The motion of distancing the forearm from the trunk is a motion of distancing the forearm and the upper arm from each other with the elbow functioning as a pivot (a motion of extending the arm). The motion of moving the arm about the shoulder is a motion of moving the fingers, the hand, or the arm without the flexion of the arm with the elbow functioning as a pivot (or without the flexion of the arm with a predetermined angle or more). For example, the motion of moving the arm about the shoulder may be a motion of drawing an arbitrary path with a fingertip.

The motions of Patterns 9 and 10 can be detected by the controller 16 on the basis of detection results from the biopotential detector 11. In this case, vital electrodes can be arranged in the wearable device 1 in such a manner that the vital electrodes are attached to body sites in charge of the motions of Patterns 9 and 10. Alternatively, the motions of Patterns 9 to 13 can be detected by the controller 16 on the basis of detection results from the acceleration sensor 12. In this case, the controller 16 detects, on the basis of the direction and magnitude change of acceleration acting on the wearable device 1 by each of the motions of Patterns 9 to 13, that such a motion has been performed. Alternatively, the respective motions of Patterns 9 to 12 can be detected by the controller 16 on the basis of detection results from the aforementioned orientation sensor 13. In this case, the controller 16 detects, on the basis of a change in the orientation of the wearable device 1 provided by each of the motions of Patterns 9 to 12, that such a motion has been performed.

According to the above, the biopotential detector 11, the acceleration sensor 12, and the orientation sensor 13 of the wearable device 1 are included in the detection modules for detecting body motions in the upper limb of the user.

FIGS. 4A and 4B are diagrams each for explaining one example of body motions that can be detected by the controller 16. FIG. 4A illustrates a first body motion M1, and FIG. 4B illustrates a second body motion M2. As illustrated in FIG. 4A, the first body motion M1 is a series of body motions in which two body motions, specifically, a body motion M11 of bringing at least two of the first to fifth fingers into contact with each other (body motion corresponding to Pattern 3 in FIG. 3) and a body motion M12 of bringing the forearm closer to the trunk (body motion corresponding to Pattern 11 in FIG. 3) are performed within a first predetermined period of time. The first predetermined period of time may be set to one second, for example. The body motion M11 and the body motion M12 in the first body motion M1 may be performed simultaneously. Alternatively, one and the other of the body motion M11 and the body motion M12 in the first body motion M1 may be successively performed within the first predetermined period of time. If the controller 16 detects the body motion M11 and the body motion M12 within the first predetermined period of time, the controller 16 recognizes these two body motions as a series of body motions, i.e., as the first body motion M1.

As illustrated in FIG. 4B, the second body motion M2 is a series of body motions in which two body motions, specifically, a body motion M21 of separating at least two of the first to fifth fingers from each other (body motion corresponding to Pattern 4 in FIG. 3) and a body motion M22 of distancing the forearm from the trunk (body motion corresponding to Pattern 12 in FIG. 3) are performed within a first predetermined period of time. The first predetermined period of time may be set to one second, for example. The body motion M21 and the body motion M22 in the second body motion M2 may be performed simultaneously. Alternatively, one and the other of the body motion M21 and the body motion M22 in the second body motion M2 may be successively performed within the first predetermined period of time. If the controller 16 detects the body motion M21 and the body motion M22 within the first predetermined period of time, the controller 16 recognizes these two body motions as a series of body motions, i.e., as the second body motion M2.

Figure 5:
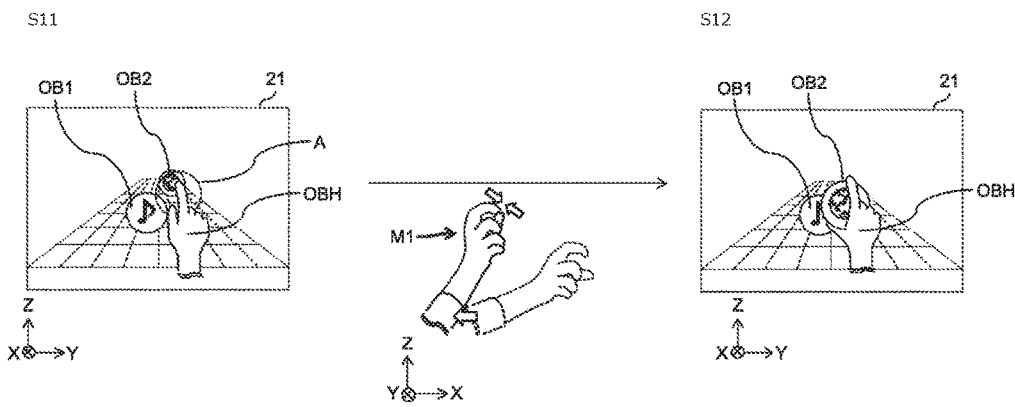
FIG. 5 is a diagram illustrating a first example of a function executed by the wearable device 1 according to the present embodiment.

FIG. 5 is a diagram illustrating a first example of a function executed by the wearable device 1 according to the present embodiment. This function is implemented by the execution of the aforementioned control program by the controller 16. FIG. 5 illustrates the display area 21 of the external display device 2. In this first example, it is assumed that the wearable device 1 is connected to the external display device 2 via wireless communication.

As illustrated in Step S11, a display object OB1 and a display object OB2 are displayed in the display area 21. The display objects OB1 and OB2 are icons each capable of executing its pre-assigned predetermined application in accordance with an execution operation performed by a user. The display object OB1 is an icon for a music reproduction application, and the display object OB2 is an icon for a browser application. The display objects OB1 and OB2, however, do not have to be icons for predetermined applications. The display objects OB1 and OB2 each may be any kind of image.

The display area 21 has a display mode that is visually recognized as a virtual three-dimensional space by a user. A case where the depth direction in the three-dimensional space corresponds to the front as seen from the user (the X-axis direction in FIG. 1) is illustrated. The display object OB1 is being displayed in the display area 21 as an image larger than the display object OB2. This causes the user to visually recognize the display object OB1 as being displayed nearer than the display object OB2. Although different from the example illustrated in Step S11, a display mode in which the display object OB1 is displayed in such a manner as to partially overlap the display object OB2 so that the display object OB1 is displayed nearer than the display object OB2 may be employed. The display modes of the display objects OB1 and OB2 (the sizes and displayed positions of the images) in Step S11 may be controlled by the external display device 2 or by the wearable device 1.

As illustrated in Step S11, an image resembling a human hand (hand object OBH) is displayed in the display area 21. In the display area 21, the hand object OBH is being displayed nearer than the display objects OB1 and OB2. The hand object OBH is an image capable of moving its displayed position in accordance with the positional movement of the user's hand, which can be detected on the basis of a detection result from the acceleration sensor 12, for example. The hand object OBH is an image capable of changing its displayed shape in accordance with the body motion of the user's hand (change in the shape of the hand), which can be detected, for example, on the basis of a detection result from the biopotential detector 11. For example, upon estimating the motion of the user's hand on the basis of a detection result from the biopotential detector 11, the wearable device 1 transmits figure information about the hand in accordance with such a hand motion to the external display device 2. Subsequently, the external display device 2 changes the shape of the hand object OBH in accordance with the received figure information. In the example of Step S11, the forefinger of the hand object OBH is being stretched in accordance with the fact that the user has stretched his/her forefinger. Step S11 illustrates, by way of example, a configuration in which a display object that at least partially overlaps, in the X-axis direction, a predetermined area A centered around the forefinger tip of the hand object OBH can be selected in accordance with a user's predetermined body motion (e.g., the motion of flexing a finger). Since both the display objects OB1 and OB2 overlap the area A in Step S11, the both can be selected by the user's predetermined body motion.

In the state illustrated in Step S11, if the user performs the first body motion M1 illustrated in FIG. 4A within the first predetermined period of time, the controller 16 recognizes the first body motion M1 on the basis of the detection results from the aforementioned detection module. The controller 16 generates a first control signal in accordance with the first body motion M1, and causes the communication module 14 to transmit the first control signal to the display device 2. The first control signal is a control signal for selecting a display object in the display area 21 of the display device 2. The first body motion M1 is a body motion in which two body motions, specifically, the body motion M11 and the body motion M12 are performed within the first predetermined period of time (see FIG. 4A). The direction in which the arm is brought closer to the trunk of the user by the body motion M12, or the direction in which the fingers or the hand is moved by the body motion M12 coincides with the negative direction in the X-axis direction. In other words, the first body motion M1 is a motion of pulling the hand back toward a position closer to the trunk of the user from a position away from the user.

Once receiving the first control signal from the wearable device 1, the display device 2 performs processing of selecting the display object in accordance with the first control signal as illustrated in Step S12. As illustrated in Step S12, the display device 2 causes the display object OB2 to be in a selected state by the selection processing, and changes the display mode in such a manner that the display object OB2 is being held by the hand object OBH. As described above, the first body motion M1 is a motion of pulling the hand back toward a position closer to the trunk of the user (in the negative direction in the X-axis direction) from a position away from the user. The display object OB2 selected in accordance with such a body motion is displayed as an image larger than the image before being in the selected state as if the display object OB2 had been pulled to the position closer to the user. If the user successively performs, for example, the supination of the forearm (the body motion corresponding to Pattern 10 in FIG. 3) after the display object OB2 is selected, i.e., after the first body motion M1 is completed, the browser application assigned to the display object OB2 is activated in accordance with such supination.

As described above, the wearable device 1 includes: a detection module configured to be worn by an upper limb of a user and detect a body motion in the upper limb; and a controller configured to detect the body motion in the upper limb from a detection result in the detection module and generate a control signal in accordance with the body motion. If the controller detects, as the body motion, at least two of a finger motion, a hand motion, and an arm motion in the upper limb within a first predetermined period of time, the controller recognizes these two body motions as a series of body motions. The controller subsequently generates a first control signal in accordance with the series of body motions as the control signal. This can reduce the likelihood of mistakenly causing an operation due to the generation of a control signal by a motion unintended by a user as compared to generating a control signal solely by one of the finger motion, the hand motion, and the arm motion in the upper limb.

Although the first example illustrates, as the series of body motions including two body motions, the body motion in which the body motion M11 of bringing at least two of the first to fifth fingers into contact with each other and the body motion M12 of bringing the forearm closer to the trunk are performed within the first predetermined period of time, the series of body motions is not limited thereto. The series of body motions may be any body motion obtained as a result of an appropriate combination of one of the patterns of the finger motions and one of the patterns of the hand motions illustrated in FIG. 3. Alternatively, the series of body motions may be any body motion obtained as a result of an appropriate combination of one of the patterns of the finger motions and one of the patterns of the arm motions. Alternatively, the series of body motions may be any body motion obtained as a result of an appropriate combination of one of the patterns of the hand motions and one of the patterns of the arm motions. For example, the series of body motions may be a motion (second body motion) in which a motion of flexing a finger (body motion corresponding to Pattern 1 in FIG. 3) and palmar flexion (body motion corresponding to Pattern 5 in FIG. 3) are performed within the first predetermined period of time. For example, the series of body motions may be a motion (third body motion) in which a motion of flexing all of the first to fifth fingers, i.e., a motion of clasping the hand (body motion corresponding to Pattern 3 in FIG. 3) and supination of the forearm (body motion corresponding to Pattern 10 in FIG. 3) are performed within the first predetermined period of time. The series of body motions may alternatively be configured by a combination of three or more body motions without being limited to a combination of two body motions. For example, the series of body motions may be a motion (fourth body motion) in which two body motions, specifically, the motion of flexing all of the first to fifth fingers, i.e., a motion of clasping the hand (body motion corresponding to Pattern 3 in FIG. 3) and the supination of the forearm (body motion corresponding to Pattern 10 in FIG. 3) are first performed and a motion of unclasping the hand is successively performed.

The first example illustrates the configuration in which the processing of selecting an icon for a predetermined application is executed in accordance with the series of body motions in which the body motion M11 and the body motion M12 are performed within the first predetermined period of time. The processing executed in accordance with the series of body motions, however, is not limited thereto. For example, processing of scrolling a predetermined image displayed on the display area 21 in the direction of the second body motion (the downward direction) may be executed in accordance with the second body motion. Screen switch-off processing for turning off the display of the display area 21, processing of limiting a predetermined function, or processing of deleting a predetermined data file, for example, may be executed in accordance with the third body motion, for example. Processing of deleting a predetermined data file, for example, may be executed in accordance with the fourth body motion, for example.

Figure 6:
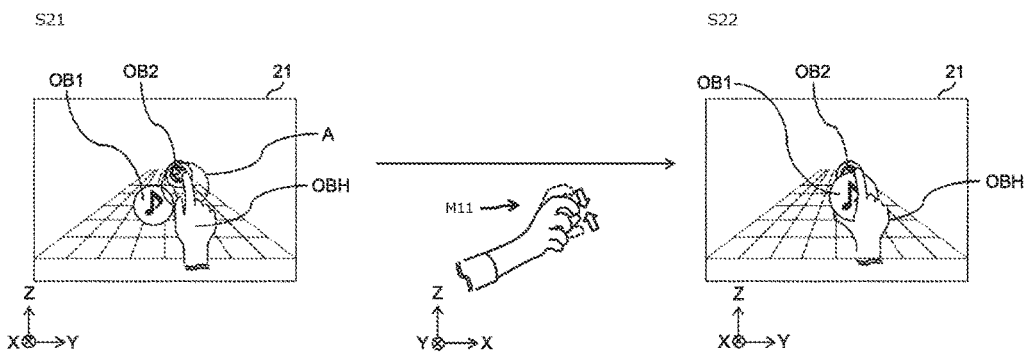
FIG. 6 is a diagram illustrating a second example of a function executed by the wearable device 1 according to the present embodiment.

FIG. 6 is a diagram illustrating a second example of a function executed by the wearable device 1 according to the present embodiment. This function is implemented by the execution of the aforementioned control program by the controller 16. FIG. 6 illustrates the display area 21 of the external display device 2. In this second example, it is assumed that the wearable device 1 is connected to the external display device 2 via wireless communication.

Step S21 is in the same state as Step S11 (see FIG. 5) in the first example. In Step S21, both the display objects OB1 and OB2 overlap the area A defined on the basis of the position of the forefinger tip of the hand object OBH. Thus, the both can be selected by a user's predetermined body motion.

If the user performs the body motion M11 (see FIG. 4A) of bringing the forefinger and the thumb into contact with each other in the state illustrated in Step S21, the controller 16 recognizes the body motion M11 on the basis of the detection result from the aforementioned detection module. The controller 16 generates a second control signal in accordance with the body motion M11 and causes the communication module 14 to transmit the second control signal to the display device 2. The second control signal is a control signal for selecting a display object in the display area 21 of the display device 2.

Once receiving the second control signal from the wearable device 1, the display device 2 performs processing of selecting the display object in accordance with the second control signal as illustrated in Step S22. As illustrated in Step S22, the display device 2 causes the display object OB1 to be in a selected state by the selection processing, and changes the display mode in such a manner that the display object OB1 is being held by the hand object OBH. If the user successively performs, for example, the supination of the forearm (the body motion corresponding to Pattern 10 in FIG. 3) after the display object OB1 is selected, i.e., after the body motion M11 is completed, the music reproduction application assigned to the display object OB1 is activated in accordance with such supination.

In the first example, if the controller 16 detects two body motions, specifically, the body motion M11 of bringing at least two of the first to fifth fingers into contact with each other and the body motion M12 of bringing the forearm closer to the trunk within the first predetermined period of time, the controller 16 recognizes these two body motions as the series of body motions M1 and generates the first control signal in accordance with such a series of body motions. In the second example, on the other hand, if the controller 16 detects only one of the body motion M11 and the body motion M12 (the body motion M11 in the above example) within the first predetermined period of time, the controller 16 generates the second control signal in accordance with such one of the body motions. In the first and second examples, the display object OB2 (first display object) is selected in accordance with the first control signal, and the display object OB1 (second display object) is selected in accordance with the second control signal. Therefore, even when both of the display objects (OB1 and OB2) are displayed at positions that can be selected by a single operation as in the first and second examples, the user can reliably select each of such display objects in accordance with whether one body motion is combined with another body motion.

As illustrated in the first and second examples, the second control signal generated in accordance with the body motion M11 is a control signal for selecting the display object OB1 (second display object) from the display objects OB1 and OB2 displayed in the display area 21. The first control signal generated in accordance with the series of body motions M1 including the body motion M11 and the body motion M12 is a control signal for selecting, from the display objects OB1 and OB2, the display object OB2 (first display object) displayed farther than the display object OB1 (second display object) in the depth direction (X-axis direction) of the display area 21. This allows a display object closer to the user to be selected by a small (simple) motion such as the body motion M11 alone, while allowing a display object displayed farther away from the user to be selected by a motion (e.g., the first body motion M1) larger (or more complicated) than the body motion M11 alone. Thus, users can easily have a mental image of such operations.

Figure 7:
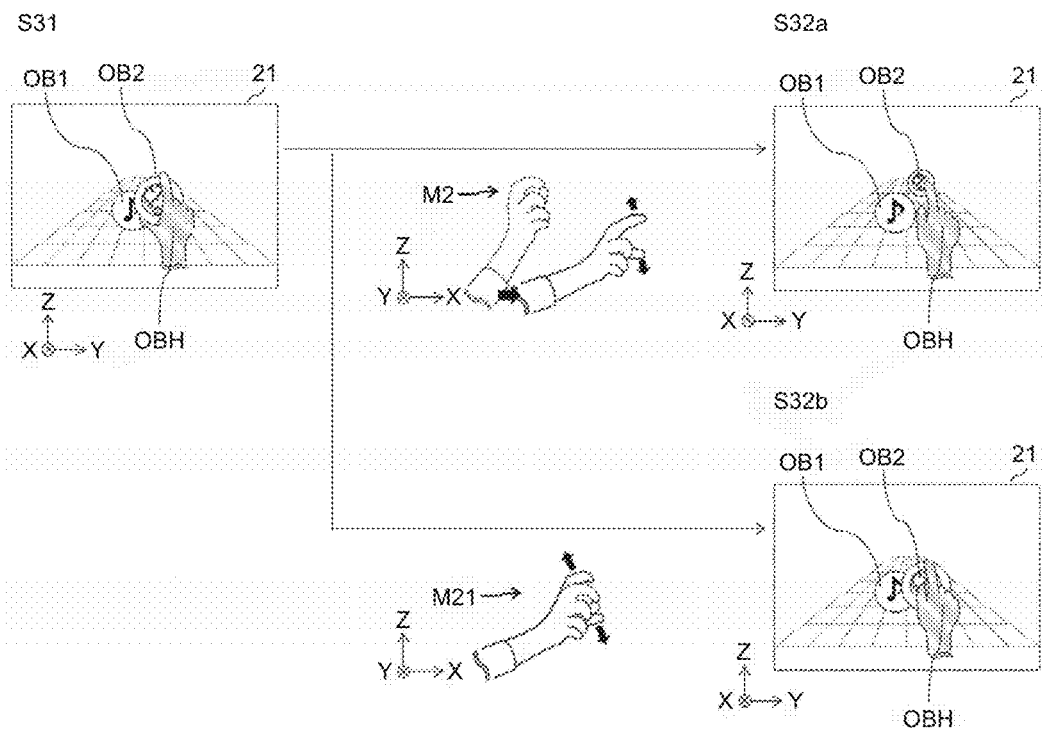
FIG. 7 is a diagram illustrating a third example of a function executed by the wearable device 1 according to the present embodiment.

FIG. 7 is a diagram illustrating a third example of a function executed by the wearable device 1 according to the present embodiment. This function is implemented by the execution of the aforementioned control program by the controller 16. FIG. 7 illustrates the display area 21 of the external display device 2. In this third example, it is assumed that the wearable device 1 is connected to the external display device 2 via wireless communication.

Step S31 is in the same state as Step S12 (see FIG. 5) in the first example, i.e., the state in which the display object OB2 is being selected.

In the state illustrated in Step S31, if the user performs the second body motion M2 illustrated in FIG. 4B within the first predetermined period of time, the controller 16 recognizes the second body motion M2 on the basis of the detection result from the aforementioned detection module. The controller 16 generates a control signal in accordance with the second body motion M2, and causes the communication module 14 to transmit the control signal to the display device 2. The control signal in accordance with the second body motion M2 is a control signal for canceling the selected state of a display object and moving the displayed position of the display object by a predetermined distance. The second body motion M2 is a body motion (see FIG. 4B) in which the two body motions, specifically, the body motion M21 and the body motion M22 are performed within the first predetermined period of time. The direction in which the arm is distanced from the trunk of the user by the body motion M22, or the direction in which the fingers or the hand is moved by the body motion M22 coincides with the positive direction in the X-axis direction (the depth direction in the display area 21). In other words, the second body motion M2 is a motion of pushing the hand out toward a position farther away from the user from a position closer to the user. The second body motion M2 is a series of body motions in which at least two of a finger motion, a hand motion, and an arm motion are performed within the first predetermined period of time as with the above first body motion M1. Thus, a control signal generated in accordance with such a second body motion M2 is referred to as the first control signal.

Once receiving the first control signal from the wearable device 1, the display device 2 cancels the selected state of the display object OB2 in accordance with the first control signal as illustrated in Step S32a. The display device 2 also moves the displayed position of the display object OB2 toward a side farther away from the user than the display object OB1 in the depth direction of the display area 21 (toward the positive direction of the X-axis).

If the user performs the body motion M21 (see FIG. 4B) of separating the forefinger and the thumb from each other in the state illustrated in Step S31, on the other hand, the controller 16 recognizes the body motion M21 on the basis of the detection result from the aforementioned detection module. The controller 16 generates a control signal in accordance with the body motion M21, and causes the communication module 14 to transmit the control signal to the display device 2. The control signal in accordance with the body motion M21 is a control signal for canceling the selected state of a display object and moving the displayed position of the display object by a predetermined distance. The body motion M21 is a body motion of at least one of a finger motion, a hand motion, and an arm motion as with the above body motion M11. Thus, a control signal generated in accordance with such a body motion M21 is referred to as the second control signal.

Once receiving the second control signal from the wearable device 1, the display device 2 cancels the selected state of the display object OB2 in accordance with the second control signal as illustrated in Step S32b. The display device 2 also moves the displayed position of the display object OB2 to a position closer to the user than the display object OB1 in the depth direction of the display area 21 (toward the negative direction of the X-axis).

As described above, the second control signal generated in accordance with the body motion M21 is a control signal for moving the displayed position of a display object displayed in the display area 21 by a second distance. The first control signal generated in accordance with the series of body motions M2 including the body motion M21 and the body motion M22 is a control signal for moving the displayed position of a display object by a first distance larger than the second distance. This allows the displayed position of a display object to be moved by a smaller distance by means of a small (simple) motion such as the body motion M21 alone, while allowing the displayed position of a display object to be moved by a larger distance by means of a motion (e.g., the second body motion M2) larger (or more complicated) than the body motion M21 alone. Thus, users can easily have a mental image of such operations.

Another Embodiment

The above-described embodiment has illustrated the configuration in which a subject to be selected from display objects displayed at different positions in the depth direction of a virtual three-dimensional space differs between the first control signal generated in accordance with a series of body motions in which at least two of a finger motion, a hand motion, and an arm motion are performed within the first predetermined period of time and the second control signal generated in accordance with only one of the at least two body motions. The above-described embodiment also has illustrated the configuration in which the moved distance of the displayed position of a display object differs between the first control signal and the second control signal. Embodiments, however, are not limited to such configurations. For example, a subject to be selected from display objects displayed at different positions in the depth direction of a three-dimensional space or the moved distance of the displayed position of a display object may differ in accordance with the detection time of the above-described series of body motions. More specifically, once the controller recognizes a series of body motions in the wearable device 1, the controller may measure a period of time during which the series of body motions is performed and generate a control signal in accordance with such a period of time.

For example, if the controller 16 detects the series of body motions M1 in which the body motion M11 and the body motion M12 are performed within the first predetermined period of time in the state illustrated in Step S11 in FIG. 5 or Step S21 in FIG. 6, the controller 16 may measure a period of time during which the first body motion M1 is performed. When the period of time is equal to or greater than a predetermined period of time (e.g., one second), the display object farther away from the user (positioned on the positive direction side of the X-axis) in the depth direction of the three-dimensional space may be selected (the same processing as Step S12 in FIG. 5). When the period of time is less than the predetermined period of time, on the other hand, the display object closer to the user (positioned on the negative direction side of the X-axis) in the depth direction of the three-dimensional space may be selected (the same processing as Step S22 in FIG. 6).

If the controller 16 detects the series of body motions M2 in which the body motion M21 and the body motion M22 are performed within the first predetermined period of time in the state illustrated in Step S31 in FIG. 7, the controller 16 may measure a period of time during which the second body motion M2 is performed. When the period of time is equal to or greater than a predetermined period of time (e.g., one second), the displayed position of the display object may be moved by a larger distance (the same processing as Step S32a in FIG. 7). When the period of time is less than the predetermined period of time, on the other hand, the displayed position of the display object may be moved by a smaller distance (the same processing as Step S32b in FIG. 7).

Alternatively, once the controller 16 recognizes a series of body motions in the wearable device 1, the controller 16 may detect a displacement amount in a predetermined part of an upper limb, which is generated by the series of body motions, and generate a control signal on the basis of such a displacement amount. The predetermined part of the upper limb may be a site to which the wearable device 1 is attached or may be a predetermined finger or hand. If the predetermined part is the site to which the wearable device 1 is attached in the upper limb, the wearable device 1 may detect a displacement amount in such a predetermined part on the basis of a change in the detected value of the acceleration sensor 12 when a body motion is performed.

For example, if the controller 16 detects the series of body motions M1 in which the body motion M11 and the body motion M12 are performed within the first predetermined period of time in the state illustrated in Step S11 in FIG. 5 or Step S21 in FIG. 6, the controller 16 may detect a displacement amount, resulting from the first body motion M1, in the predetermined part of the upper limb. When the displacement amount is equal to or greater than a predetermined distance (e.g., 5 cm), the display object farther away from the user (positioned on the positive direction side of the X-axis) in the depth direction of the three-dimensional space may be selected (the same processing as Step S12 in FIG. 5). When the displacement amount is less than the predetermined distance, on the other hand, the display object closer to the user (positioned on the negative direction side of the X-axis) in the depth direction of the three-dimensional space may be selected (the same processing as Step S22 in FIG. 6).

If the controller 16 detects, in the wearable device 1, the series of body motions M2 in which the body motion M21 and the body motion M22 are performed within the first predetermined period of time, the controller 16 may detect a displacement amount in accordance with the second body motion M2 in the predetermined part of the upper limb. When the displacement amount is equal to or greater than a predetermined distance (e.g., 5 cm), the displayed position of the display object may be moved by a larger distance (the same processing as Step S32a in FIG. 7). When the displacement amount is less than the predetermined distance, on the other hand, the displayed position of the display object may be moved by a smaller distance (the same processing as Step S32b in FIG. 7).

Alternatively, once the controller 16 recognizes a series of body motions in the wearable device 1, the controller 16 may detect a directional change amount in a predetermined part of an upper limb, which is generated by the series of body motions, and generate a control signal in accordance with such a change amount. The predetermined part of the upper limb may be, for example, a site to which the wearable device 1 is attached. If the predetermined part is the site to which the wearable device 1 is attached in the upper limb, the wearable device 1 may detect a directional change amount in the predetermined part on the basis of a change in the detected value of the acceleration sensor 12 or a change in the detected value of the orientation sensor when a body motion is performed.

For example, if the controller 16 detects the series of body motions M1 in which the body motion M11 and the body motion M12 are performed within the first predetermined period of time in the state illustrated in Step S11 in FIG. 5 or Step S21 in FIG. 6, the controller 16 may detect a directional change amount in accordance with the first body motion M1 in the predetermined part of the upper limb. When the change amount is equal to or greater than a predetermined angle (e.g., 15 degrees), the display object farther away from the user (positioned on the positive direction side of the X-axis) in the depth direction of the three-dimensional space may be selected (the same processing as Step S12 in FIG. 5). When the change amount is less than the predetermined angle, on the other hand, the display object closer to the user (positioned on the negative direction side of the X-axis) in the depth direction of the three-dimensional space may be selected (the same processing as Step S22 in FIG. 6).

If the controller 16 detects, in the wearable device 1, the series of body motions M2 in which the body motion M21 and the body motion M22 are performed within the first predetermined period of time, the controller 16 may detect a directional change amount in accordance with the second body motion M2 in the predetermined part of the upper limb. When the change amount is equal to or greater than a predetermined angle (e.g., 15 degrees), the displayed position of the display object may be moved by a larger distance (the same processing as Step S32a in FIG. 7). When the change amount is less than the predetermined angle, on the other hand, the displayed position of the display object may be moved by a smaller distance (the same processing as Step S32b in FIG. 7).

Another Embodiment

Figure 8:
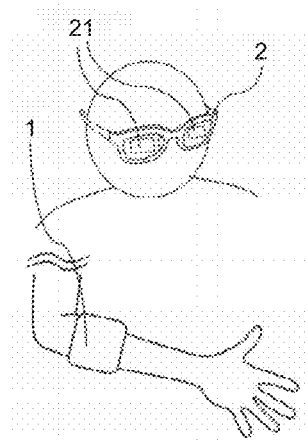
FIG. 8 is a diagram illustrating another embodiment of the external display device.

Although the above-described embodiment has illustrated a television set, a smartphone, a notebook computer, etc., as examples of the external display device 2, the display device 2 is not limited thereto. The display device 2 may be a head-mounted display (or a glasses-like terminal) as illustrated in FIG. 8, for example. The head-mounted display 2 displays images on parts (display areas 21) of regions corresponding to lenses of a pair of glasses.

Another Embodiment

Figure 9:
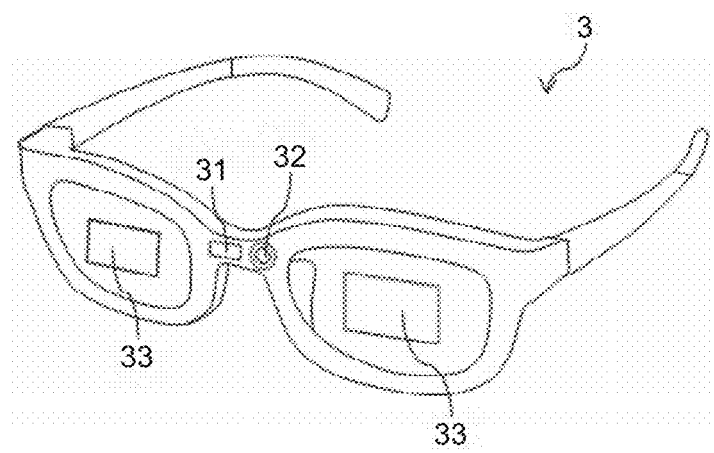
FIG. 9 is a diagram illustrating another embodiment of the wearable device.

Although the detection module for detecting a body motion in an upper limb is the biopotential detector 11, the acceleration sensor 12, or the orientation sensor 13 in the above-described embodiment, the detection module may be an imaging module capable of detecting a body motion in an upper limb. For example, the wearable device according to the present embodiment may be a head-mounted display 3 as illustrated in FIG. 9. On the front side of the head-mounted display 3, an optical camera 31 may be provided as an imaging module capable of detecting a body motion in an upper limb of a user or an infrared camera (also having a function of applying infrared light) 32 may be provided as an imaging module. In the head-mounted display 3, images are displayed on parts (display areas 33) of regions corresponding to lenses of the pair of glasses. The controller 16 can detect a body motion in an upper limb of a user by analyzing a captured image obtained by the imaging module. In the above-described embodiments, the communication module 14 is provided for transmitting a generated control signal to the external display device and the controller 16 generates, as a control signal, a display control signal for controlling the display contents of the external display device. In the present embodiment, however, the communication module does not necessarily need to be provided. The wearable device 1 may include the display modules 33. The controller 16 may detect a series of body motions in which at least two of a finger motion, a hand motion, and an arm motion are performed within the first predetermined period of time on the basis of a detection result from the optical camera 31 or the infrared camera 32 as the imaging module, and generate a control signal in accordance with the series of body motions as a display control signal for controlling the display contents of the display module 33.

Although the embodiments according to the present invention have been described above, it should be noted that numerous variations and modifications will be apparent to those skilled in the art in light of the present disclosure. Therefore, it should be noted that such variations and modifications fall within the scope of the present invention. Furthermore, all of the technical matters disclosed in the present specification can be compatibly rearranged. A plurality of components may be combined together or divided.

Although the configurations and operations of the wearable device 1 have been described in the above-described embodiments, embodiments are neither limited to such configurations nor operations, and may be configured as a method or a program for providing components. As illustrated above, embodiments may be configured as a network system including the wearable device 1 and another electronic device.

The present invention can provide a wearable device that reduces the likelihood of mistakenly causing an operation by a motion unintended by a user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wearable device, comprising:
   a detection module configured to be worn by an upper limb of a user and detect a body motion in the upper limb; and
   a controller configured to detect the body motion in the upper limb on a basis of a detection result from the detection module and generate a control signal in accordance with the body motion, wherein
   when the controller detects, as the body motion, at least two of a finger motion, a hand motion, and an arm motion in the upper limb within a first predetermined period of time, the controller
      recognizes the two body motions as a series of body motions,
      generates, as the control signal, a first control signal in accordance with the series of body motions, and
      manipulates a first display object from a plurality of display objects displayed in a display area,
   when the controller detects only one of the at least two body motions within the first predetermined period of time, the controller
      generates a second control signal in accordance with the one of the at least two body motions, and
      manipulates a second display object from the plurality of display objects,
   the first display object is displayed, in an object selectable area, farther away from the user than the second display object in a depth direction of the display area, and
   the two body motions for manipulating the first display object, which is farther away from the user than the second display object in the depth direction, include a backward motion of pulling the upper limb of the user backwards toward the user's body, wherein the backward motion is a first motion in the two body motions.

2. The wearable device according to claim 1, comprising a communication module configured to transmit the control signal to an external display device, wherein
   the controller is configured to generate, as the control signal, a display control signal for controlling display contents of the external display device.

3. The wearable device according to claim 2, wherein when the controller recognizes the series of body motions, the controller measures a period of time during which the series of body motions is performed and generates the display control signal in accordance with the period of time.

4. The wearable device according to claim 2, wherein when the controller recognizes the series of body motions, the controller detects a displacement amount in accordance with the series of body motions in a predetermined part of the upper limb and generates the display control signal in accordance with the displacement amount.

5. The wearable device according to claim 2, wherein when the controller recognizes the series of body motions, the controller detects a directional change amount in accordance with the series of body motions in a predetermined part of the upper limb and generates the display control signal in accordance with the change amount.

6. The wearable device according to claim 1, comprising a display module, wherein
   the controller is configured to generate, as the control signal, a display control signal for controlling display contents of the display module.

7. The wearable device according to claim 6, wherein when the controller recognizes the series of body motions, the controller measures a period of time during which the series of body motions is performed and generates the display control signal in accordance with the period of time.

8. The wearable device according to claim 6, wherein when the controller recognizes the series of body motions, the controller detects a displacement amount in accordance with the series of body motions in a predetermined part of the upper limb and generates the display control signal in accordance with the displacement amount.

9. The wearable device according to claim 6, wherein when the controller recognizes the series of body motions, the controller detects a directional change amount in accordance with the series of body motions in a predetermined part of the upper limb and generates the display control signal in accordance with the change amount.

10. The wearable device according to claim 1, wherein another one of the at least two body motions is either the finger motion or the hand motion, and
    the backward motion of pulling the upper limb of the user backwards is the arm motion of pulling the hand of the user backwards toward the user's body.

11. The wearable device according to claim 1, wherein the controller is configured to
    set the object selectable area for selecting one of the plurality of display objects, and
    manipulate the first display object or the second display object by the control signal generated in accordance with the body motion, when the first or second display object partially or fully overlaps the object selectable area.

12. The wearable device according to claim 11, wherein the controller is configured to set the object selectable area as a circular region,
    the circular region having a center at an end of an object corresponding to the user's finger, and
    the circular region having an area larger than an area of the end of the object corresponding to user's finger.

13. The wearable device according to claim 1, wherein the second display object is displayed as covering a part of the first display object.

* * * * *